(12) United States Patent
Sako

(10) Patent No.: US 12,105,994 B2
(45) Date of Patent: Oct. 1, 2024

(54) PRINTING APPARATUS, CONTROL METHOD, AND PROGRAM DISPLAYING 2D CODE WITH IDENTIFICATION INFORMATION ALLOCATED BY PRINT SERVICE ONLY IF PRINTER REGISTERED TO PRINT SERVICE

(71) Applicant: CANON KABUSHIKI KAISHA, Tokyo (JP)

(72) Inventor: Ritsuto Sako, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/318,900

(22) Filed: May 17, 2023

(65) Prior Publication Data

US 2023/0409247 A1 Dec. 21, 2023

(30) Foreign Application Priority Data

Jun. 15, 2022 (JP) .................................. 2022-096754

(51) Int. Cl.
*G06F 3/12* (2006.01)
*H04N 1/32* (2006.01)

(52) U.S. Cl.
CPC ............ *G06F 3/1204* (2013.01); *G06F 3/121* (2013.01); *G06F 3/1231* (2013.01);
(Continued)

(58) Field of Classification Search
CPC ............ H04N 1/0023; H04N 1/00233; H04N 1/00408; H04N 1/00411; H04N 1/00413; H04N 1/00472; H04N 1/00474; H04N 1/00477; H04N 1/0048; H04N 1/2346; H04N 1/2369; H04N 1/2392; H04N 1/32523; H04N 1/32539; H04N 1/32122; H04N 1/32177; H04N 2201/3269; H04N 2201/3273; G06F 3/1204; G06F 3/121; G06F 3/1231; G06F 3/1236; G06F 3/1253; G06F 3/1267; G06F 3/1268; G06F 3/1284; G06F 3/1285; G06F 3/1286; G06F 3/1287; G06F 3/1288; G06F 3/1291; G06F 3/1292
See application file for complete search history.

(56) References Cited

U.S. PATENT DOCUMENTS 8,294,938 B2 * 10/2012 Yamaguchi ........ H04N 1/00344
358/1.14
8,432,568 B2 * 4/2013 Yamaguchi ........ H04N 1/00474
358/1.15

(Continued)

FOREIGN PATENT DOCUMENTS

JP 2016081322 A 5/2016

*Primary Examiner* — Scott A Rogers
(74) *Attorney, Agent, or Firm* — ROSSI, KIMMS & McDOWELL LLP

(57) ABSTRACT

A printing apparatus includes a receiving unit configured to receive, from a print server that provides a logical printer associated with the printing apparatus, a print job associated with the logical printer, a print unit configured to perform printing based on the print job, and a display control unit configured to electronically display, on a display device of the printing apparatus, a two-dimensional code obtained by encoding identification information allocated to the logical printer by the print server.

14 Claims, 12 Drawing Sheets

(52) U.S. Cl.
CPC .......... *G06F 3/1253* (2013.01); *G06F 3/1286* (2013.01); *G06F 3/1288* (2013.01); *H04N 1/32117* (2013.01); *H04N 2201/3269* (2013.01); *H04N 2201/3273* (2013.01)

(56) References Cited

U.S. PATENT DOCUMENTS

| | | | | |
|---|---|---|---|---|
| 8,869,247 | B2* | 10/2014 | Matsumura | H04N 1/4426 726/4 |
| 10,126,989 | B2* | 11/2018 | Yamada | G06F 3/1222 |
| 10,244,037 | B2* | 3/2019 | Yagiura | H04L 67/10 |
| 10,552,094 | B2* | 2/2020 | Sako | G06F 3/1231 |
| 10,819,872 | B2* | 10/2020 | Hirasawa | H04N 1/00411 |
| 11,467,782 | B2* | 10/2022 | Saeda | G06F 3/1238 |
| 11,503,172 | B2* | 11/2022 | Morito | H04N 1/00514 |
| 11,758,070 | B2* | 9/2023 | Watanabe | G06V 40/10 358/1.15 |
| 11,775,235 | B2* | 10/2023 | Saito | G06F 3/1287 358/1.15 |
| 2006/0268334 | A1* | 11/2006 | Nakamura | G06F 3/1239 358/448 |
| 2011/0075176 | A1* | 3/2011 | Nishio | G06F 3/1285 358/1.14 |
| 2012/0110066 | A1* | 5/2012 | Furuta | H04L 67/02 709/203 |
| 2013/0242335 | A1* | 9/2013 | Naitoh | G06F 3/1238 358/1.14 |
| 2015/0116756 | A1* | 4/2015 | Mori | H04N 1/00854 358/1.14 |
| 2015/0116764 | A1* | 4/2015 | Mori | G06F 3/126 358/1.15 |
| 2015/0317551 | A1* | 11/2015 | Mori | G06K 15/4095 358/1.14 |
| 2017/0192723 | A1* | 7/2017 | Ichikawa | H04W 12/50 |
| 2018/0376029 | A1* | 12/2018 | Nakagawa | H04N 1/00514 |
| 2019/0171399 | A1* | 6/2019 | Saito | G06F 3/1228 |
| 2020/0285437 | A1* | 9/2020 | Mori | G06F 3/1203 |
| 2021/0029101 | A1* | 1/2021 | Igari | G06K 7/1417 |
| 2021/0240418 | A1* | 8/2021 | Saito | G06F 3/1222 |
| 2021/0373821 | A1* | 12/2021 | Moriya | G06F 3/1206 |
| 2022/0400014 | A1* | 12/2022 | Mori | G06F 3/1289 |
| 2023/0007141 | A1* | 1/2023 | Tanaka | G06F 16/9554 |
| 2023/0171827 | A1* | 6/2023 | Takeuchi | H04W 12/06 358/1.15 |
| 2023/0199124 | A1* | 6/2023 | Nakajima | H04N 1/32358 358/1.15 |

* cited by examiner

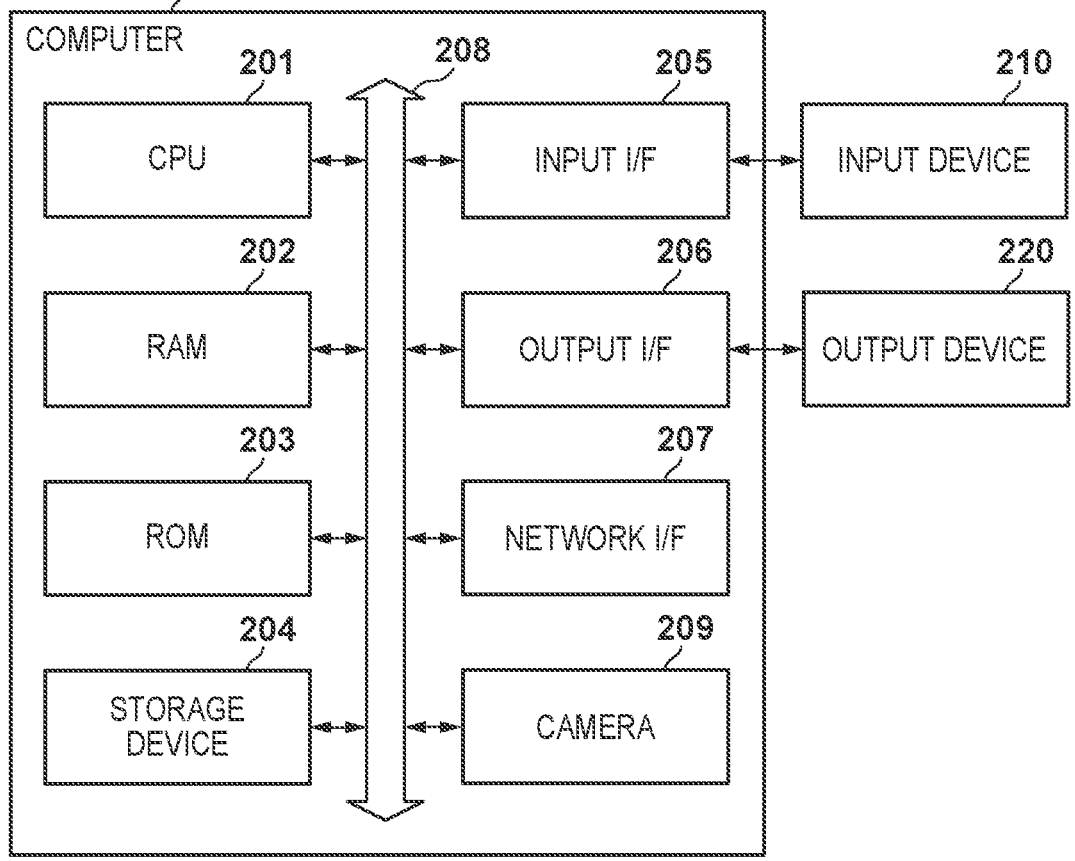
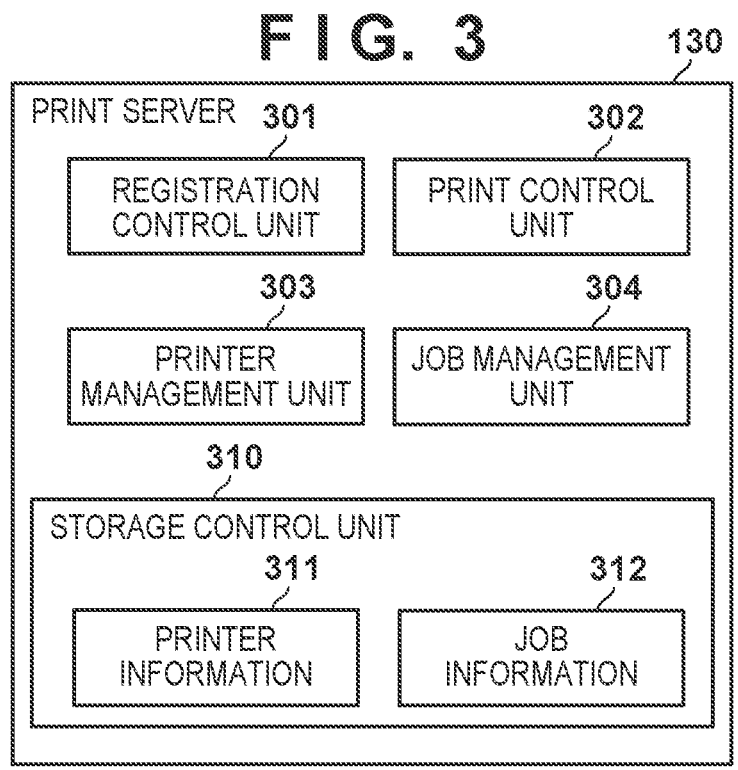

| PRINTER NAME | CLOUD PRINTER ID | TYPE | STATUS | PRINTER CAPABILITY | RELATED PRINTER |
|---|---|---|---|---|---|
| 1001 | 1002 | 1003 | 1004 | 1005 | 1006 |
| COMPREHENSIVE LOGICAL PRINTER A | c7565f07… | COMPREHENSIVE | NORMAL | CAPABILITY A | INDIVIDUAL LOGICAL PRINTERS A TO C |
| INDIVIDUAL LOGICAL PRINTER A | f3rguzms… | INDIVIDUAL | NORMAL | CAPABILITY B | PHYSICAL PRINTER A |
| INDIVIDUAL LOGICAL PRINTER B | 6ymgtz2… | INDIVIDUAL | NORMAL | CAPABILITY C | PHYSICAL PRINTER B |
| INDIVIDUAL LOGICAL PRINTER C | 79806d24… | INDIVIDUAL | ERROR | CAPABILITY D | PHYSICAL PRINTER C |

| JOB ID | RELATED PRINTER | OWNER | STATUS | PRINT DATA | PRINT SETTING |
|---|---|---|---|---|---|
| 1021 | 1022 | 1023 | 1024 | 1025 | 1026 |
| m3xfizja | COMPREHENSIVE LOGICAL PRINTER A | … | ONGOING | … | … |
| s5xhwr2y | INDIVIDUAL LOGICAL PRINTER A | … | ONGOING | … | … |

PRINTING APPARATUS, CONTROL METHOD, AND PROGRAM DISPLAYING 2D CODE WITH IDENTIFICATION INFORMATION ALLOCATED BY PRINT SERVICE ONLY IF PRINTER REGISTERED TO PRINT SERVICE

BACKGROUND OF THE INVENTION

Field of the Invention

The present invention relates to a printing apparatus, a control method thereof, and a non-transitory storage medium.

Description of the Related Art

Cloud print services that use a cloud have been proposed. Each cloud print service provides a logical printer, and a print job submitted to the logical printer is executed by a physical printer associated with the logical printer. Printing that uses a logical printer may be called "cloud printing". In a cloud print service, unique identification information is allocated to a logical printer. This identification information can also be called a "cloud print ID". Japanese Patent Laid-Open No. 2016-81322 proposes presenting a two-dimensional code obtained by encoding a cloud print ID, in order to reduce the user operation to input the cloud print ID to a mobile terminal. In this technique, the two-dimensional code obtained by the encoding the cloud print ID is printed onto paper, and the paper is attached to a printing apparatus, thereby presenting the two-dimensional code. However, preparing such presentation is burdensome work for the user of the printing apparatus.

SUMMARY OF THE INVENTION

Some aspects of the present disclosure provide a technique for reducing user operations. According to some embodiments, a printing apparatus comprising: a receiving unit configured to receive, from a print server that provides a logical printer associated with the printing apparatus, a print job associated with the logical printer; a print unit configured to perform printing based on the print job; and a display control unit configured to electronically display, on a display device of the printing apparatus, a two-dimensional code obtained by encoding identification information allocated to the logical printer by the print server is provided.

Further features of the present invention will become apparent from the following description of exemplary embodiments with reference to the attached drawings.

BRIEF DESCRIPTION OF THE DRAWINGS

FIG. 2 is a block diagram describing an exemplary hardware configuration of a computer according to the first embodiment.

FIG. 3 is a block diagram describing an exemplary functional configuration of a print server according to the first embodiment.

FIGS. 10A and 10B are diagrams respectively describing examples of printer information and job information according to the first embodiment.

DESCRIPTION OF THE EMBODIMENTS

Figure 1:
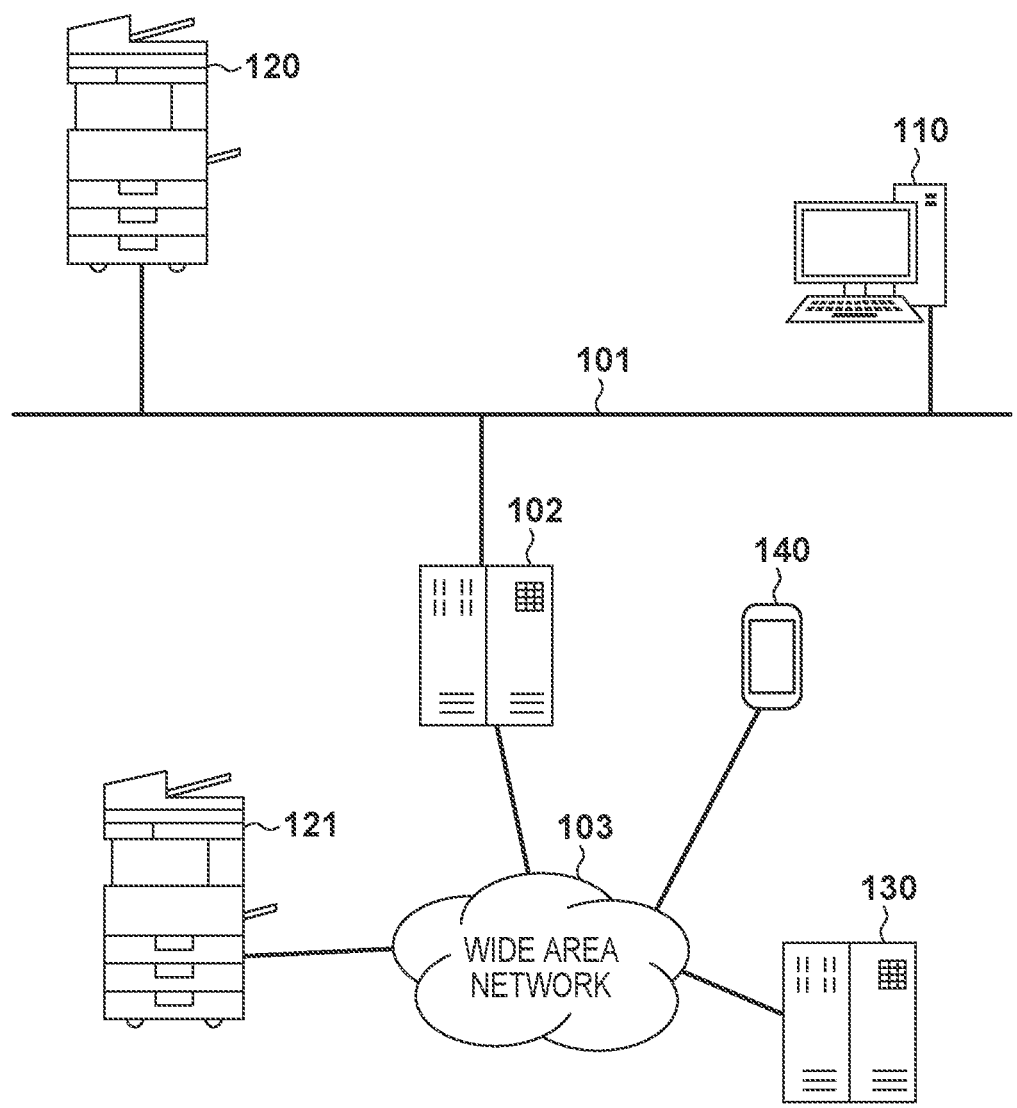
FIG. 1 is a schematic diagram describing an exemplary configuration of a print system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

Exemplary Configuration of Print System

An exemplary configuration of a print system according to a first embodiment will be described with reference to FIG. 1. The print system includes an information processing apparatus 110, printing apparatuses 120 and 121, a print server 130, and a mobile communication apparatus 140, for example. The number of constituent elements of the print system is not limited to the example in FIG. 1. In addition, the print system may include a constituent element that is not shown in FIG. 1.

The information processing apparatus 110 and the printing apparatus 120 are connected to the same local area network (LAN) 101. The LAN 101 may be a wired LAN or a wireless LAN, or may be a combination thereof. The LAN 101 is connected to a wide area network 103 (for example, the Internet) via a firewall 102. The printing apparatus 121 and the print server 130 are also connected to the wide area network 103. The information processing apparatus 110 and the printing apparatus 120 can communicate with each other within the LAN 101 (that is to say, without using the wide area network 103). In addition, the information processing apparatus 110 and the printing apparatus 120 can communicate with the print server 130 through the LAN 101, the firewall 102, and the wide area network 103. The printing apparatus 121 may be connected to the wide area network 103 through a LAN or a cellular network (for example, a network that complies with the fourth-generation communication standard (4G) or the fifth-generation communication standard (5G)). The information processing apparatus 110 and the mobile communication apparatus 140 may also be connected to the wide area network 103 through a cellular network. In addition, the mobile communication apparatus 140 may also be connectable to the LAN 101.

The printing apparatuses 120 and 121 have a print function of performing printing based on a print job. The printing apparatuses 120 and 121 may have at least one of a scanner function or a facsimile function in addition to the print function. A printing apparatus that has a plurality of functions in this manner may also be referred to as a multifunction printer (MFP). Alternatively, the printing apparatuses 120 and 121 may be dedicated machines (SFPs: Single Function Peripherals) that have the print function only. Printing may be printing that is performed onto a sheet-like recording medium such as paper, or may be formation of a three-dimensional object (so-called three-dimensional printing).

The print server 130 provides a print service for transmitting a print job to any printing apparatus (for example, the printing apparatus 120), in accordance with a print job generated by the information processing apparatus 110. The print server 130 provides a logical printer to the information processing apparatus 110, and accepts a print job for the logical printer, for example. The logical printer is a virtual printing apparatus (for example, a printer object) provided by the print server 130. The logical printer can also be referred to as a "cloud printer". The information processing apparatus 110 can also generate a print queue for the logical printer in a similar manner to the printing apparatuses 120 and 121. Compared with the logical printer, a physical printing apparatus such as the printing apparatus 120 or 121 can also be referred to as a "physical printer". The physical printer can also be referred to as a "local printer" when connected to the same LAN connected to an information processing apparatus that submits a print job. In the following description, the logical printer and the physical printers are simply referred to as "printers" in a collective manner.

The print server 130 may be a server in an on-premise environment connected to the wide area network 103, or may be a server in a cloud computing environment (hereinafter, simply referred to as a "cloud"). A print service that is provided by the print server 130 in the cloud may also be referred to as a cloud print service (hereinafter, referred to as a "CPS"). Universal Print (registered trademark) provided by Microsoft (registered trademark) corporation is an example of the cloud print service. In the following description, a case will be described in which the print server 130 is in a cloud. However, the following description also applies to a case where the print server 130 is in an on-premise environment.

The information processing apparatus 110 provides a print function to the user of the information processing apparatus 110. The information processing apparatus 110 may designate a physical printer (for example, the printing apparatus 120) connected to the sane LAN 101, as an output destination, or may designate a logical printer provided by the print server 130, as an output destination. When the logical printer is designated as an output destination, a physical printer (for example, the printing apparatus 120) associated with the logical printer performs printing. The information processing apparatus 110 that uses CPS may also be referred to as a "client" or a "client terminal". Printing that is performed by submitting a print job to the logical printer can also be referred to as "cloud printing". Printing that is performed through cloud printing may be executed by the printing apparatus 120 connected to the same LAN 101 to which the information processing apparatus 110 is connected, or may also be executed by the printing apparatus 121 that is not connected to the LAN 101. Printing that is performed by directly (that is to say, within the LAN) submitting a print job to a physical printer can be referred to as "local print".

Exemplary Hardware Configuration of Computer

An exemplary hardware configuration of the computer 200 according to the present embodiment will be described with reference to FIG. 2. The computer 200 may be used as the information processing apparatus 110, may be used as the print server 130, or may be used as the mobile communication apparatus 140. The computer 200 may include the constituent elements shown in FIG. 2.

A central processing unit (CPU) 201 is a general-purpose processing circuit for controlling overall operations of the computer 200. A random access memory (RAM) 202 is a volatile memory circuit, and is used as a temporary storage region such as a work area for processing that is performed by the CPU 201. A read-only memory (ROM) 203 is a non-volatile memory circuit, and stores programs and data that are used for processing that is performed by the CPU 201. A storage device 204 is a non-volatile storage device, and stores programs and data that are used for processing that is performed by the CPU 201. The storage device 204 may be a hard disk drive (HDD) or a solid state drive (SSD), for example. The storage device 204 may also be referred to as a "secondary storage unit". Operations that are performed by the computer 200 may be realized by the CPU 201 executing programs loaded from the storage device 204 to the RAM 202.

An input interface (I/F) 205 is an I/F for transmitting/receiving signals to/from an input device 210. The input device 210 is a device for obtaining input from the user of the computer 200. The input device 210 may be a keyboard, a touch panel, a microphone, a mouse, or any combination thereof, for example. An output I/F 206 is an I/F for transmitting/receiving signals to/from an output device 220. The output device 220 is a device for providing information to the user of the computer 200. The output device 220 may be a display, a speaker, or any combination thereof, for example. A network I/F 207 is an I/F for communicating with an external apparatus of the computer 200. The CPU 201, the RAM 202, the ROM 203, the storage device 204, the input I/F 205, the output I/F 206, and the network I/F 207 are connected to a system bus 208. In the example in FIG. 2, the input device 210 and the output device 220 are illustrated as devices different from the computer 200. Alternatively, the computer 200 may include the input device 210 and the output device 220. When, for example, the computer 200 is used as the mobile communication apparatus 140, the mobile communication apparatus 140 may include the input device 210 and the output device 220. Furthermore, the computer 200 (specifically, the mobile communication apparatus 140) may include a camera 209.

Exemplary Functional Configuration of Print Server

An exemplary functional configuration of the print server 130 will be described with reference to FIG. 3. The print server 130 may include the functional units shown in FIG. 3. The print server 130 may include a functional unit that is not shown in FIG. 3. The functional units in FIG. 3 may be realized by the CPU 201 executing programs loaded to the RAM 202. Alternatively, some or all of the functional units in FIG. 3 may be realized by a dedicated processing circuit such as an application specific integrated circuit (ASIC).

A registration control unit 301 performs processing for registering a logical printer. The registration control unit 301 generates a logical printer associated with a physical printer in accordance with a registration start request from a printing apparatus, and registers the generated logical printer in printer information 311, for example. The logical printer registered in the printer information 311 is recognized as a printer by the information processing apparatus 110. The physical printer associated with the logical printer may be a physical printer that performs printing in accordance with a print job submitted to the logical printer. The logical printer may be associated with only one physical printer. The physical printer may be associated with only one logical printer, or may be associated with a plurality of logical printers.

A print control unit 302 performs processing related to a print job for the logical printer. The print control unit 302 receives a print job for the logical printer, from the information processing apparatus 110, and based on this, transmits the print job to the physical printer associated with the logical printer, for example. In addition, the print control unit 302 may control an event related to the print job. An event related to a print job may include receiving a print job, for example. In response to an event request received from the physical printer, the print control unit 302 may return an event related to the physical printer.

A printer management unit 303 manages information related to the logical printer registered in the print server 130, as the printer information 311. The printer information 311 includes capability information of the physical printer associated with the logical printer, a cloud printer ID uniquely allocated to the logical printer, information regarding a print queue in which a print job is spooled, and the like.

A job management unit 304 manages information regarding a print job received from the information processing apparatus 110, as job information 312. The job information 312 includes information regarding a print job and the state of the print job, print data included in the print job, and the like.

A storage control unit 310 stores information to the RAM 202 or the storage device 204, and reads out information from the RAM 202 or the storage device 204, in accordance with an instruction from another functional unit. According to the present embodiment, the storage control unit 310 stores the printer information 311 and the job information 312.

Exemplary Functional Configuration of Information Processing Apparatus

Figure 4:
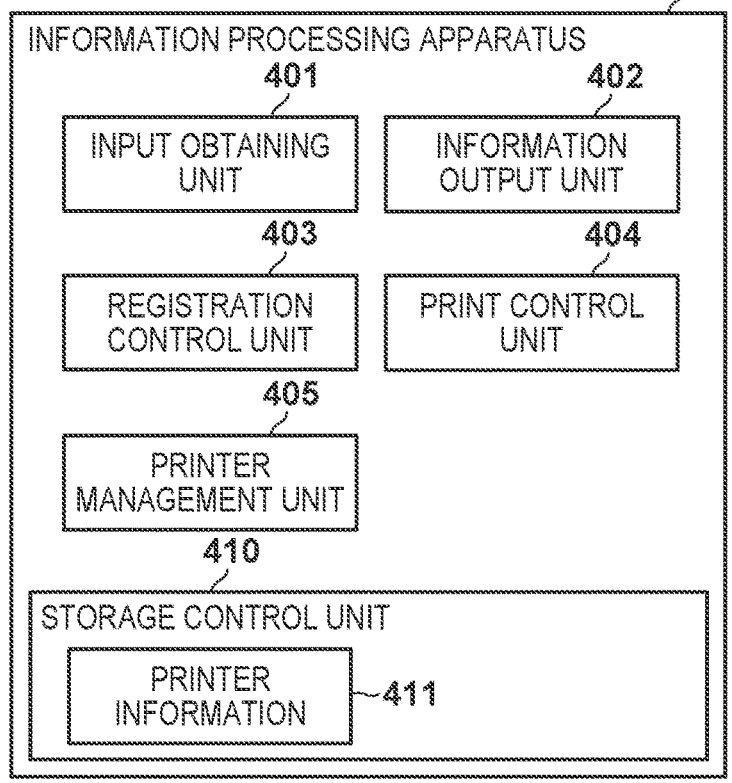
FIG. 4 is a block diagram describing an exemplary functional configuration of an information processing apparatus according to the first embodiment.

An exemplary functional configuration of the information processing apparatus 110 will be described with reference to FIG. 4. The information processing apparatus 110 may include the functional units shown in FIG. 4. The information processing apparatus 110 may include a functional unit that is not shown in FIG. 4. The functional units in FIG. 4 may be realized by the CPU 201 executing programs loaded to the RAM 202. Alternatively, some or all of the functional units in FIG. 4 may be realized by a dedicated processing circuit such as an ASIC.

An input obtaining unit 401 obtains input from the user of the information processing apparatus 110 using the input OF 205. An information output unit 402 outputs information to the user of the information processing apparatus 110 using the output OF 206.

A registration control unit 403 performs processing for registering a logical printer to the print server 130. A print control unit 404 performs processing related to printing that is performed by a printer. The print control unit 404 may transmit a print job to the logical printer registered in the print server 130, in accordance with a print instruction from the user of the information processing apparatus 110, for example. The print control unit 404 may transmit a print job directly (that is to say, in the same LAN) to a physical printer in accordance with a print instruction from the user of the information processing apparatus 110.

A printer management unit 405 manages information regarding a printer to which the information processing apparatus 110 can submit a print job, as printer information 411. The printer information 411 includes capability information of the printer and the like.

A storage control unit 410 stores information to the RAM 202 or the storage device 204 and reads out information from the RAM 202 or the storage device 204 in accordance with an instruction from another functional unit. According to the present embodiment, the storage control unit 410 stores the printer information 411.

Exemplary Hardware Configuration of Printing apparatus

Figure 5:
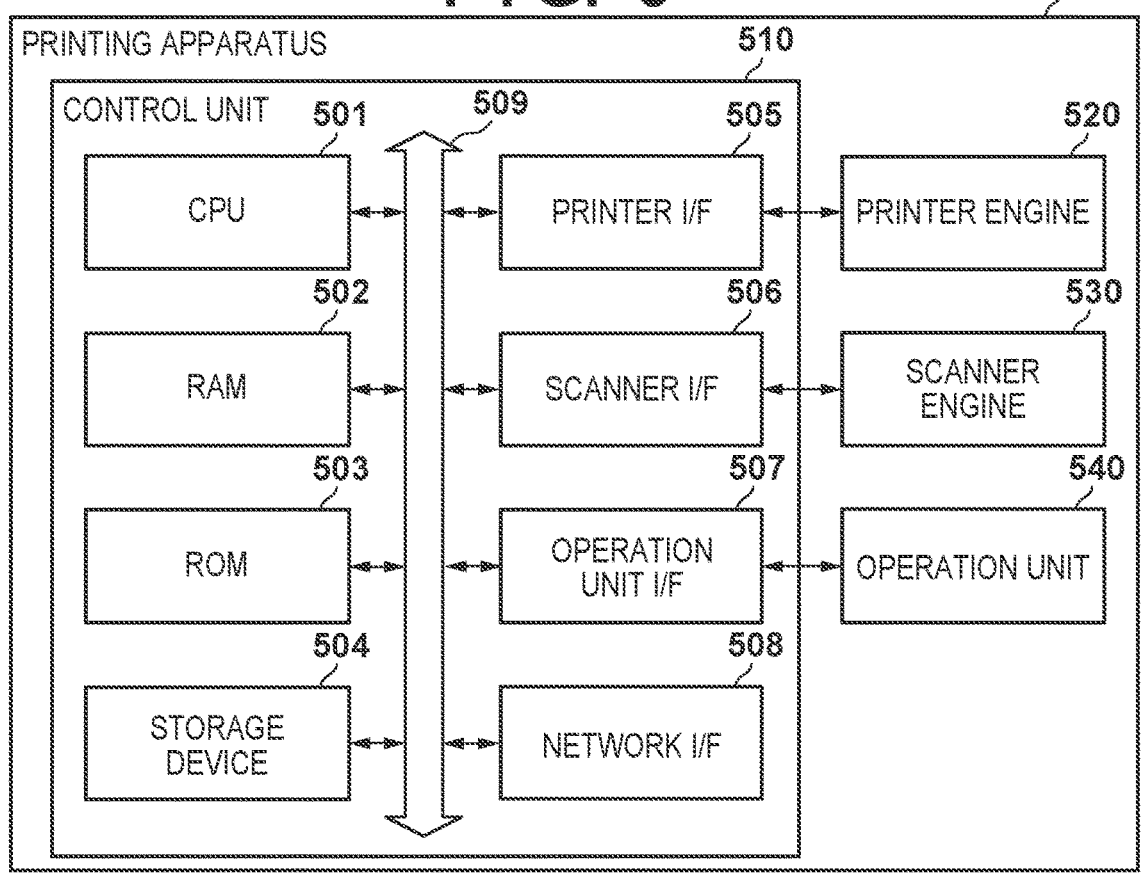
FIG. 5 is a block diagram describing an exemplary hardware configuration of a printing apparatus according to the first embodiment.

An exemplary hardware configuration of a printing apparatus 500 according to the present embodiment will be described with reference to FIG. 5. The printing apparatus 500 may be used as the printing apparatus 120, or may be used as the printing apparatus 121. The printing apparatus 500 may include the constituent elements shown in FIG. 5. The printing apparatus 500 is a physical printing apparatus, and thus is also referred to as a "physical printer".

A CPU 501 is a general-purpose processing circuit for controlling overall operations of the printing apparatus 500. A RAM 502 is a volatile memory circuit, and is used as a temporary storage region such as a work area for processing that is performed by the CPU 501. A ROM 503 is a non-volatile memory circuit, and stores programs and data used for processing that is performed by the CPU 501. A storage device 504 is a non-volatile storage unit, and stores programs and data that are used for processing that is performed by the CPU 501 (for example, a print job, image data, and setting information). The storage device 504 may be an HDD or an SSD, for example. The storage device 504 may also referred to as a "secondary storage unit". Operations that are performed by the printing apparatus 500 may be realized by the CPU 501 executing programs loaded from the storage device 504 to the RAM 502.

A printer OF 505 is an OF for transmitting/receiving signals to/from a printer engine 520. The printer engine 520 performs printing based on a signal (for example, image signals or a print command) supplied from a control unit 510 through the printer OF 505. Printing may be electrophotographic printing in which toner is transferred onto paper and is fixed, may be inkjet printing that is performed by discharging ink to paper, or may be three-dimensional printing.

A scanner OF 506 is an OF for transmitting/receiving signals to/from a scanner engine 530. The scanner engine 530 supplies signals (for example, image signals) obtained by reading a document, to the control unit 510 via the scanner OF 506. The CPU 501 may process the image signals supplied from the scanner engine 530, and supply record image signals obtained as a result of the processing, to the printer engine 520. In addition, the CPU 501 may generate image data based on the image signals supplied from the scanner engine 530, and transmit the generated image data to an external apparatus.

An operation unit OF 507 is an OF for transmitting/receiving signals to/from an operation unit 540. The operation unit 540 is a device that obtains input from the user of the printing apparatus 500, and provides information to the user of the printing apparatus 500. The operation unit 540 may be a display panel (for example, a liquid crystal display), a speaker, a touch panel, a keyboard, buttons, or a touch screen, or may be constituted by any combination thereof, for example.

A network OF 508 is an OF for communicating with an external apparatus of the printing apparatus 500. The control unit 510 is constituted by the CPU 501, the RAM 502, the ROM 503, the storage device 504, the printer OF 505, the scanner OF 506, the operation unit OF 507, and the network OF 508. The constituent elements included in the control unit 510 are connected to a system bus 509.

Exemplary Configuration of Operation Unit of Printing Apparatus

Figure 6:
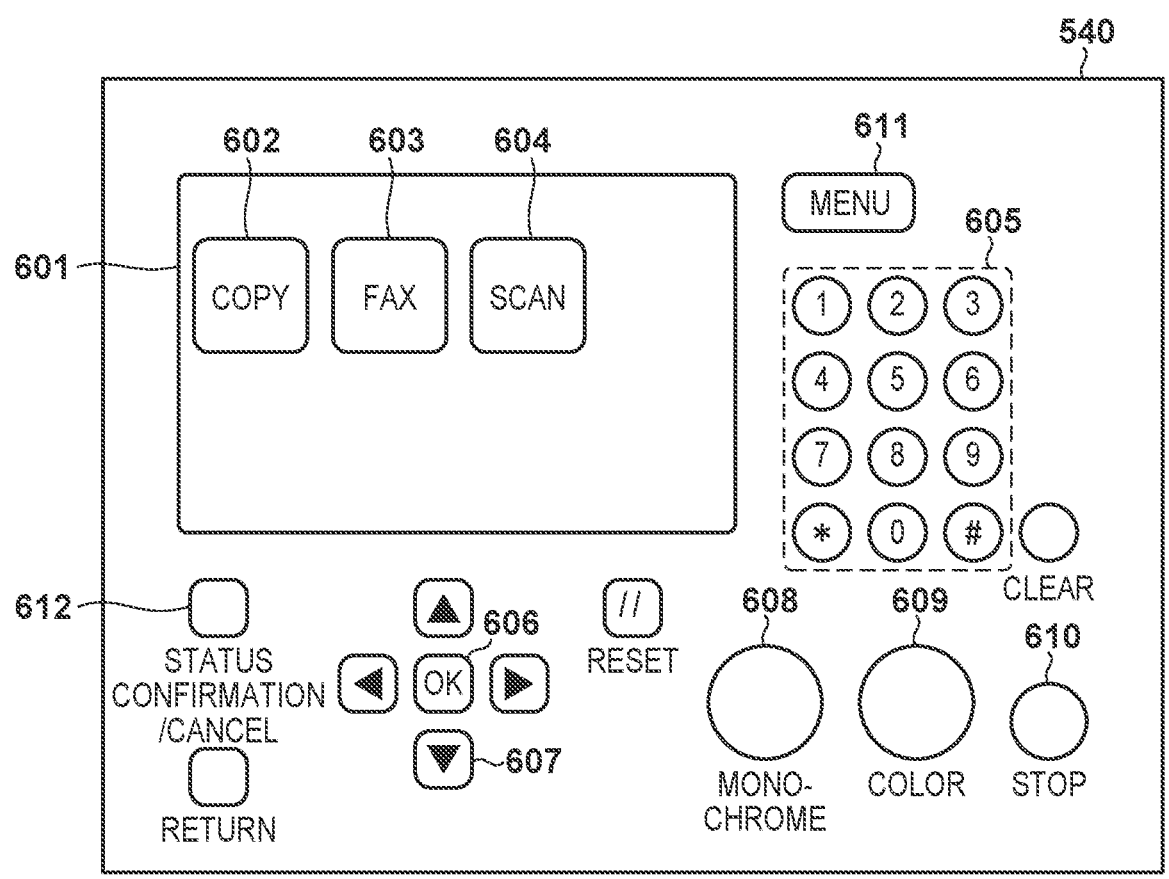
FIG. 6 is a schematic diagram describing an exemplary configuration of an operation unit of the printing apparatus according to the first embodiment.

An exemplary configuration of the operation unit 540 of the printing apparatus 500 will be described with reference to FIG. 6. In the example in FIG. 6, the operation unit 540 is configured as an operation panel made in the form of a panel. The operation unit 540 may include the constituent elements shown in FIG. 6. The operation unit 540 may also include a constituent element that is not shown in FIG. 6.

A display panel 601 is a touch screen obtained by integrally forming a touch panel for obtaining input from the user and a display (for example, a liquid crystal display) for displaying information to the user. In the example in FIG. 6, buttons 602 to 604 are displayed on the display panel 601. The button 602 is a software button for obtaining, from the user, an instruction to make a switch to a copy mode. The printing apparatus 500 displays a copy operation screen on the display panel 601 in accordance with the user touching the button 602. The button 603 is a software button for obtaining, from the user, an instruction to make a switch to a facsimile mode. The printing apparatus 500 displays a facsimile operation screen on the display panel 601 in accordance with the user touching the button 603. The button 604 is a software button for obtaining, from the user, an instruction to make a switch to a scanner mode. The printing apparatus 500 displays a scanner operation screen on the display panel 601 in accordance with the user touching the button 604. In addition, a dialogue for interaction with the user, and a job list of cloud printing may be displayed on the display panel 601.

A numeric keypad 605 is a group of physical buttons for obtaining, from the user, input of a number or the like. A button 606 is a physical button for obtaining, from the user, an instruction to determine display content on the display panel 601, or the like. Direction keys 607 are physical buttons for obtaining, from the user, an instruction to select an item from a menu displayed on the display panel 601, or the like. A button 608 is a physical button for obtaining an instruction for monochrome copy, from the user. A button 609 is a physical button for obtaining an instruction for color copy, from the user. A button 610 is a physical button for obtaining, from the user, an instruction to stop processing. A button 611 is a physical button for obtaining, from the user, an instruction to display a menu screen for performing settings of the printing apparatus 500 and the like. A button 612 is a physical button for obtaining, from the user, an instruction to display the state of the printing apparatus 500, such as a list of print jobs that the printing apparatus 500 has received.

Exemplary Functional Configuration of Printing Apparatus

An exemplary functional configuration of the printing apparatus 500 will be described with reference to FIG. 7. The printing apparatus 500 may include the functional units shown in FIG. 7. The printing apparatus 500 may include a functional unit that is not shown in FIG. 7. The functional units in FIG. 7 may be realized by the CPU 501 executing programs loaded to the RAM 502.

Figure 7:
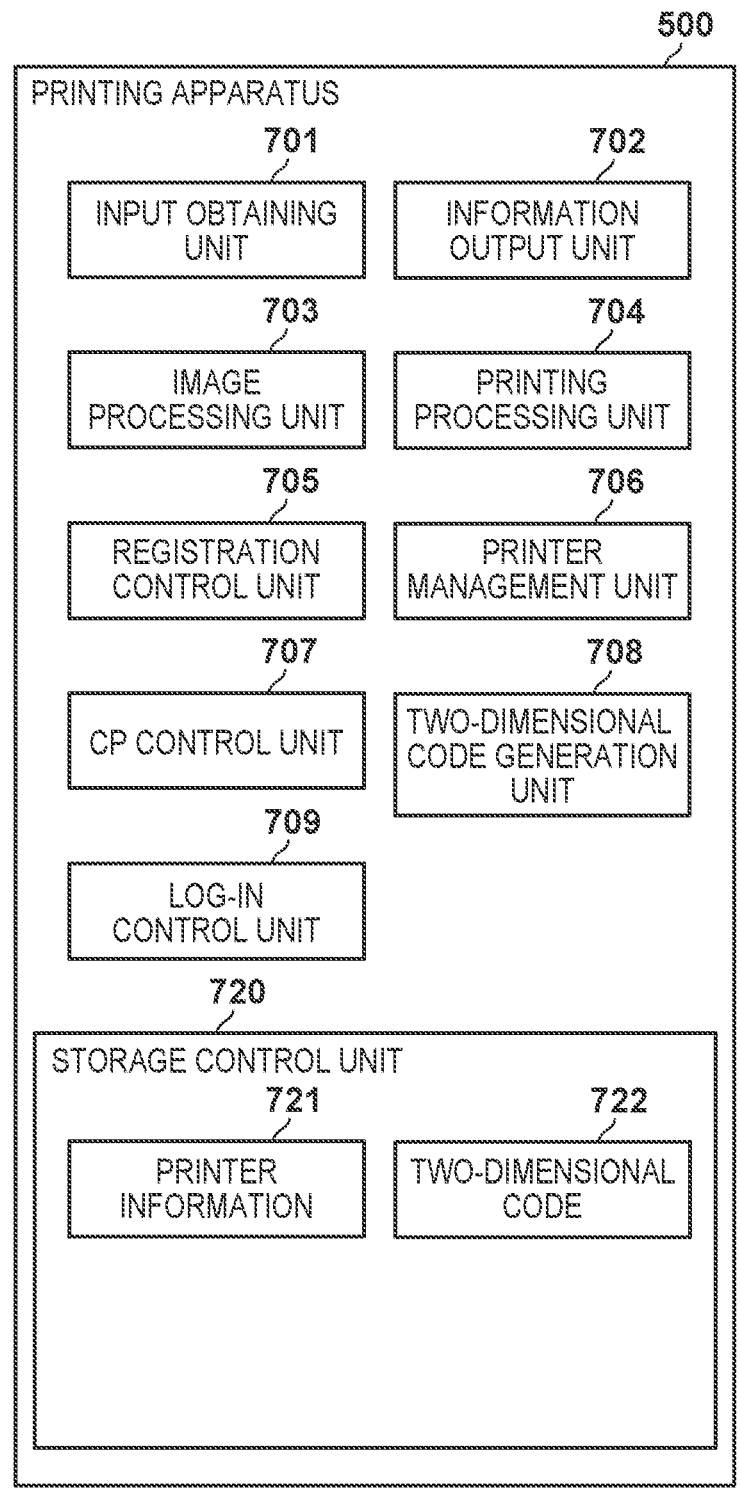
FIG. 7 is a block diagram describing an exemplary functional configuration of the printing apparatus according to the first embodiment.

Alternatively, some or all of the functional units in FIG. 7 may also be realized by a dedicated processing circuit such as an ASIC.

An input obtaining unit 701 obtains input from the user of the printing apparatus 500 using the operation unit OF 507. An information output unit 702 outputs information to the user of the printing apparatus 500 using the operation unit OF 507. An image processing unit 703 renders a print job to produce printing image data. A printing processing unit 704 prints the image data obtained by the image processing unit 703 rendering the print job.

A registration control unit 705 performs processing for registering a logical printer associated with the printing apparatus 500 to the print server 130. A printer management unit 706 manages information regarding the printing apparatus 500 as printer information 721. The printer information 721 may include, for example, the state of the printing apparatus 500, the capability of the printing apparatus 500, and a cloud printer ID uniquely allocated by the print server 130 to the logical printer associated with the printing apparatus 500. In addition, the printer information 721 may include local printer IDs for the information processing apparatus 110 to identify printing apparatuses within the same LAN 101.

A cloud print (CP) control unit 707 performs processing related to cloud printing. The CP control unit 707 may transfer print data received from the print server 130, to the image processing unit 703, for example. In addition, the CP control unit 707 may transmit an event request to the print server 130.

A two-dimensional code generation unit 708 generates a two-dimensional code by encoding information (for example, a cloud printer ID). The two-dimensional code may be a QR code (registered trademark) or another two-dimensional code. A log-in control unit 709 controls processing for logging into the printing apparatus 500, which is performed by the user of the printing apparatus 500.

A storage control unit 720 stores information to the RAM 502 or the storage device 504, and reads out information from the RAM 502 or the storage device 504, in accordance with an instruction from another functional unit. According to the present embodiment, the storage control unit 720 stores printer information 721 and a two-dimensional code 722. The two-dimensional code 722 is a two-dimensional code obtained by encoding a cloud printer ID allocated to the logical printer associated with the printing apparatus 500.

Overall Processing Sequence of Cloud Printing

Figure 8:
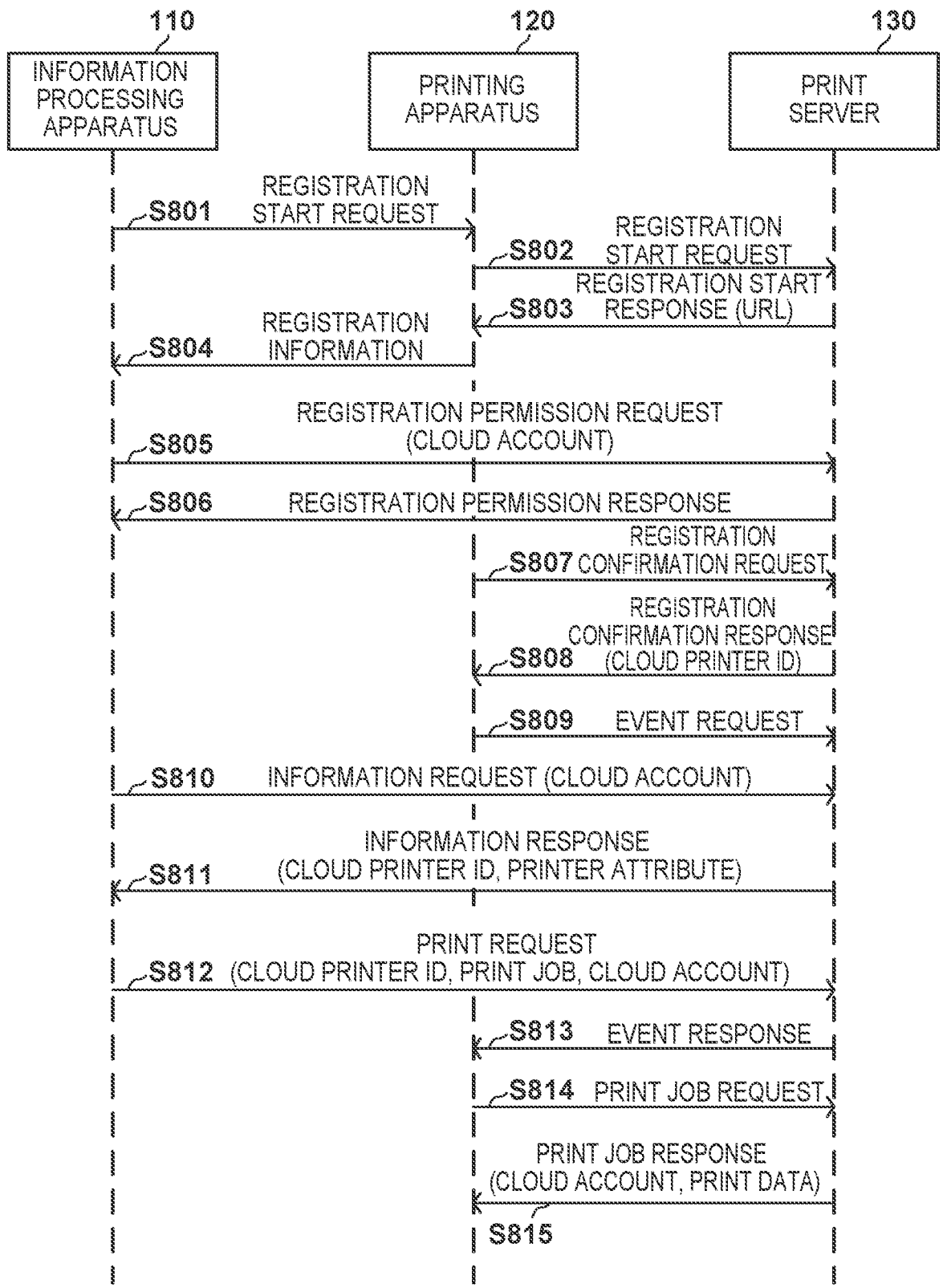
FIG. 8 is a sequence diagram describing overall processing of cloud printing according to the first embodiment.

A sequence of overall processing for performing cloud printing will be described with reference to FIG. 8. The example in FIG. 8 illustrates a case where the information processing apparatus 110 registers the printing apparatus 120 to the print server 130, and submits a print job to a logical printer associated with the printing apparatus 120. Registering the printing apparatus 120 to the print server 130 may be registering the logical printer associated with the printing apparatus 120 to the print server 130. Assume that, in the following example, the printing apparatus 120 supports a Web User Interface (UI) function for operating the printing apparatus 120 through the information processing apparatus 110. In addition, assume that the information processing apparatus 110 supports a Web UI client function. Mutual communication between the information processing apparatus 110, the printing apparatus 120, and the print server 130 may be performed using an Internet Printing Protocol (IPP).

In step S801, the registration control unit 403 of the information processing apparatus 110 transmits a registration start request to the printing apparatus 120 in accordance with an instruction from the user of the information processing apparatus 110. The registration start request may be a request to start processing for registering the printing apparatus 120 to the print server 130. The registration start request may be transmitted using the Web UI client function of the information processing apparatus 110.

In step S802, the registration control unit 705 of the printing apparatus 120 transmits a registration start request to the print server 130 in accordance with the registration start request being received from the information processing apparatus 110. The registration start request may be a request to start processing for registering the printing apparatus 120 to the print server 130.

In step S803, the registration control unit 301 of the print server 130 transmits a registration start response to the printing apparatus 120 in accordance with the registration start request being received from the printing apparatus 120. The registration start response includes a uniform resource locator (URL) of a Web page for inputting information for the user of the information processing apparatus 110 to register the printing apparatus 120 to the print server 130.

In step S804, the registration control unit 705 of the printing apparatus 120 transmits registration information to the information processing apparatus 110 in accordance with the registration start response being received from the print server 130. The registration information includes the URL included in the registration start response. The information output unit 402 of the information processing apparatus 110 displays the Web page to the user in accordance with the registration information being received from the printing apparatus 120.

In step S805, the registration control unit 403 of the information processing apparatus 110 transmits a registration permission request to the print server 130 in accordance with the user of the information processing apparatus 110 accessing the URL and inputting information required for registration. The registration permission request includes a cloud account of the user of the information processing apparatus 110. The cloud account is an account for the user to use a tenant in the cloud that includes the print server 130.

In step S806, the registration control unit 301 of the print server 130 checks whether or not the cloud account included in the registration permission request belongs to a user that has authority to register the printing apparatus 120 to the print server 130. If the cloud account belongs to a user that has the authority, the registration control unit 301 of the print server 130 transmits a registration permission response to the information processing apparatus 110. The registration permission response may be a message for performing notification of a result of checking whether or not the user of the information processing apparatus 110 is a user that has the authorization to register the printing apparatus 120.

In step S807, the printer management unit 706 of the printing apparatus 120 transmits a registration confirmation request to the print server 130 in accordance with the registration start response being received from the print server 130. The registration confirmation request is a request related to registration of the printing apparatus 120 to the print server 130, and, specifically, the registration confirmation request may be a request to register the printing apparatus 120 to the print server 130.

In step S808, the printer management unit 303 of the print server 130 generates a new logical printer in accordance with the registration confirmation request being received from the printing apparatus 120, associates the logical printer with the printing apparatus 120, and adds the logical printer to the printer information 311. Accordingly, the printing apparatus 120 is registered to the print server 130, and the information processing apparatus 110 can perform cloud printing that uses the logical printer. In addition, the printer management unit 303 of the print server 130 allocates a unique cloud printer ID to the generated logical printer, associates this cloud printer ID with the logical printer, and adds the cloud printer ID to the printer information 311. The registration control unit 301 of the print server 130 then transmits a registration confirmation response to the printing apparatus 120. The registration confirmation response includes the cloud printer ID of the printing apparatus 120. In addition, the two-dimensional code generation unit 708 of the printing apparatus 120 creates the two-dimensional code 722 obtained by encoding the received cloud printer ID. The storage control unit 720 of the printing apparatus 120 stores the two-dimensional code 722.

In step S809, the CP control unit 707 of the printing apparatus 120 transmits an event request to the print server 130 in accordance with the registration confirmation response being received from the print server 130. The event request may be a request to notify the printing apparatus 120 that an event related to the printing apparatus 120 has occurred, when it occurred. The event request may be a request related to an event of a print job being submitted to the logical printer associated with the printing apparatus 120.

In step S810, the printer management unit 405 of the information processing apparatus 110 transmits an information request to the print server 130 in accordance with an instruction from the user of the information processing apparatus 110. The information request may be a request to obtain information regarding a logical printer that can be used by the user of the information processing apparatus 110. The information request includes a cloud account of the user of the information processing apparatus 110.

In step S811, the printer management unit 303 of the print server 130 transmits an information response to the information processing apparatus 110 in accordance with the information request being received from the information processing apparatus 110. The information response includes the cloud printer ID and a printer attribute of each of one or more logical printers that can be used by the user of the information processing apparatus 110. The printer management unit 405 of the information processing apparatus 110 updates the printer information 411 based on the information response.

In step S812, the printer management unit 405 of the information processing apparatus 110 transmits a print request to the print server 130 in accordance with an instruction from the user of the information processing apparatus 110. The print request includes a cloud printer ID, information regarding a print job, and the cloud account of the user of the information processing apparatus 110. The information regarding the print job includes print data and print setting. The print request may be a request requesting that the print data included in the print request be printed by a logical printer that has the cloud printer ID included in the print request.

In step S813, the print control unit 302 of the print server 130 transmits an event response to the printing apparatus 120 associated with the logical printer, in accordance with the print request being received from the information processing apparatus 110. The event response is a response to the event request received in step S809. The event response is a response for performing notification that an event of a type specified by the event request has occurred.

In step S814, the CP control unit 707 of the printing apparatus 120 transmits a print job request to the print server 130 in accordance with the event response being received from the print server 130. The print job request may be a request to obtain a print job that is to be executed by the printing apparatus 120.

In step S815, the print control unit 302 of the print server 130 transmits a print job response to the printing apparatus 120 in accordance with the print job request being received from the printing apparatus 120. The print job response includes the cloud account and the print job. The printing apparatus 120 then performs printing based on the print job in accordance with the print job response being received from the print server 130. The print job response received by the printing apparatus 120 from the print server 130 may be the Fetch-Job Response of IPP.

In the description given with reference to FIG. 8, registration of the printing apparatus 120 in steps S801 to S806 and cloud printing in steps S810 to S815 may be performed by the same user, or may be performed by different users.

Comprehensive Logical Printer and Individual Logical Printers

A comprehensive logical printer and individual logical printers that are provided by the print server 130 will be described. In the present embodiment, the print server 130 may be able to provide a comprehensive logical printer and individual logical printers. As described above, a logical printer is a virtual printing apparatus (for example, a printer object) provided by the print server 130. An individual logical printer is a logical printer associated with a specific physical printer. A print job submitted to an individual logical printer can be printed by a physical printer associated with the individual logical printer. A comprehensive logical printer is a logical printer that is not directly associated with a specific physical printer, and is associated with one or more individual logical printers. Typically, a comprehensive logical printer is associated with a plurality of individual logical printers. A print job submitted to the comprehensive logical printer moves to one of the individual logical printers associated with the comprehensive logical printer in accordance with an instruction from the user. In other words, the print job submitted to the comprehensive logical printer is submitted to one of the individual logical printers. The print job can then be printed by a physical printer associated with this individual logical printer.

A configuration may be adopted in which, for example, the registration control unit 705 of the print server 130 can register the comprehensive logical printer and the individual logical printers to the print server 130, in accordance with an instruction from the user of the printing apparatus 500 or the administrator of the print system. As described above, for example, in step S808 in FIG. 8, the registration control unit 403 of the print server 130 registers a logical printer. This logical printer is associated with a specific physical printer, and is thus registered as an individual logical printer. In addition, when a comprehensive logical printer is already registered in a tenant in a cloud to which a user that registered a physical printer belongs, the registration control unit 403 of the print server 130 may associate the newly registered individual logical printer with the comprehensive logical printer.

Figure 9:
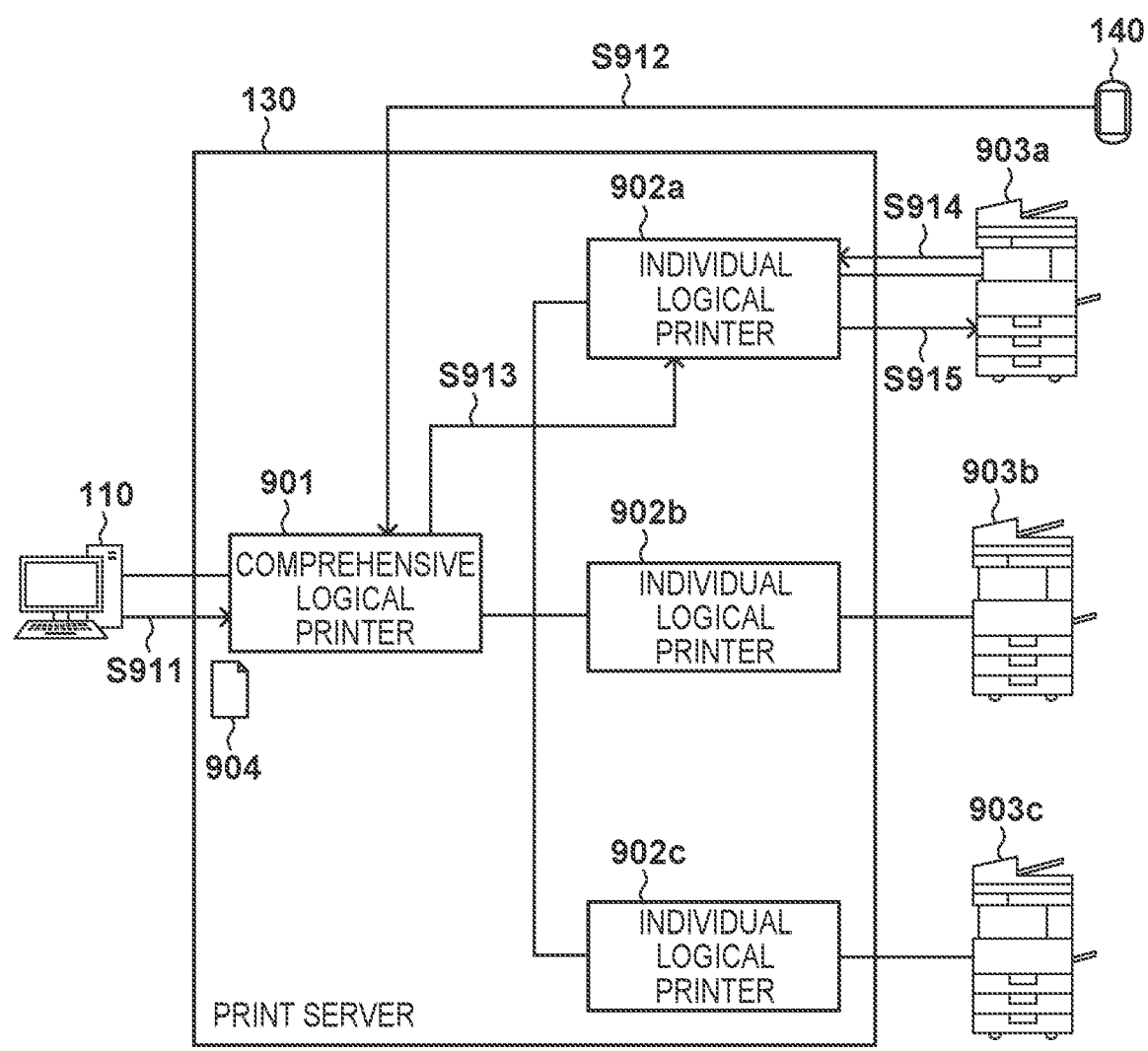
FIG. 9 is a schematic diagram describing a comprehensive logical printer and individual logical printers according to the first embodiment.

Examples of the comprehensive logical printer and the individual logical printers that are provided by the print server 130 will be described with reference to FIG. 9. One comprehensive logical printer 901 and three individual logical printers 902a to 902c are registered in the print server 130, and the print server 130 provides these four logical printers. The three individual logical printers 902a to 902c are all associated with the comprehensive logical printer 901. In addition, the three individual logical printers 902a to 902c are respectively associated with three physical printers 903a to 903c. The individual logical printer 902a is associated only with the physical printer 903a among the three physical printers 903a to 903c, for example. The physical printers 903a to 903c may have a configuration similar to that of the printing apparatus 500. The physical printers 903a to 903c may be connected to the same LAN 101 to which the information processing apparatus 110 is connected, as with the printing apparatus 120, and does not need to be connected to the same LAN 101 to which the information processing apparatus 110 is connected, as with the printing apparatus 121.

A processing flow of printing that is performed by submitting a print job to the comprehensive logical printer 901 will be described with reference to FIG. 9. In step S911, the print control unit 404 of the information processing apparatus 110 submits a print job 904 to the comprehensive logical printer 901. At this stage, the user of the information processing apparatus 110 does not need to specify which physical printer is to perform printing.

In step S912, in order to cause the physical printer 903a perform printing, the user that has submitted the print job 904 or another user instructs the print server 130 to move the print job 904 submitted to the comprehensive logical printer 901, to the individual logical printer 902a. This instruction may be given using either the mobile communication apparatus 140 or the physical printer 903a. This instruction includes identification information (job ID) of the job to be moved, and the cloud printer ID of the individual logical printer 902a that is a destination.

In step S913, the job management unit 304 of the print server 130 moves the print job 904 from the comprehensive logical printer 901 to the individual logical printer 902a. Accordingly, the print job 904 is associated with the individual logical printer 902a, and thus the print job 904 can be printed by the physical printer 903a.

In step S914, the CP control unit 707 of the physical printer 903a transmits a print job request to the individual logical printer 902a (step S814 in FIG. 8). In step S915, the print control unit 302 of the print server 130 transmits a print job response to the physical printer 903a in accordance with the print job request being received from the physical printer 903a (step S815 in FIG. 8). This print job response includes the print job 904. The printing processing unit 704 of the physical printer 903a then performs printing based on the print job 904.

In the above example, the user instructs that the print job 904 be moved from the comprehensive logical printer 901 to the individual logical printer 902a, but may instruct that the print job 904 be moved to the individual logical printer 902b or 902c. In this case, printing is performed by the physical printer 903b or 903c. In this manner, after the print job 904 is submitted to the print server 130, the user can cause any of the physical printers 903a to 903c to perform processing. Such a printing method can be called "pull printing".

Specific Example of Printer Information of Print Server and Specific Example of Job Information A specific example of the printer information 311 that is managed by the printer management unit 303 of the print server 130 will be described with reference to FIG. 10A. In the example in this figure, the printer information 311 is stored in a table format. Records in the printer information 311 respectively represent logical printers. A logical printer may be a comprehensive logical printer, or may be an individual logical printer. A record 1011 represents the comprehensive logical printer 901 in FIG. 9, for example. Records 1012 to 1014 respectively represent the individual logical printers 902a to 902c in FIG. 9, for example. The printer information 311 may include information regarding a print queue, in addition to later-described information, for example.

A column 1001 shows the names of the logical printers. A column 1002 shows cloud printer IDs uniquely allocated to the logical printers by the print server 130. One individual logical printer is associated with one physical printer, and thus the cloud printer ID of the individual logical printer also uniquely identifies a physical printer. A column 1003 shows the types of the logical printers. A type of logical printer may be either "comprehensive" indicating that the type of the logical printer is a comprehensive logical printer or "individual" indicating that the type of the logical printer is an individual logical printer. A column 1004 shows the states of the logical printers.

A column 1005 shows the printer capabilities of the logical printers. If a logical printer is an individual logical printer, the printer capability of the individual logical printer may be a printer capability of a physical printer associated with the individual logical printer. The printer capability may be having a color print function, having a sort function, and the like. The printer capability of the comprehensive logical printer may be obtained through logical sum of the printer capabilities of one or more individual logical printers associated with the comprehensive logical printer. When, for example, at least one of the individual logical printers associated with the comprehensive logical printer has a sort function, or the other individual logical printers associated with the comprehensive logical printer do not have the sort function, the comprehensive logical printer may be managed as a logical printer that has the sort function.

A column 1006 shows printers associated with the logical printers. If a logical printer is a comprehensive logical printer, one or more individual logical printers are associated with this comprehensive logical printer. If a logical printer is an individual logical printer, one physical printer is associated with this individual logical printer.

A specific example of the job information 312 managed by the job management unit 304 of the print server 130 will be described with reference to FIG. 10B. In the example in this figure, the job information 312 is stored in a table format. Records in the job information 312 respectively represent print jobs submitted to the print server 130.

A column 1021 shows a job ID uniquely allocated to each print job by the print server 130. A column 1022 shows a logical printer associated with the print job. When a print job is submitted to a specific logical printer, this print job is associated with the specific logical printer. As described above with reference to FIG. 9, a logical printer associated with a print job may be changed to another logical printer in accordance with an instruction from the user.

A column 1023 shows a user that has submitted the print job. A column 1024 shows the state of the print job. A column 1025 shows print data to be printed based on the print job. A column 1026 shows settings for printing the print job.

Figure 11:
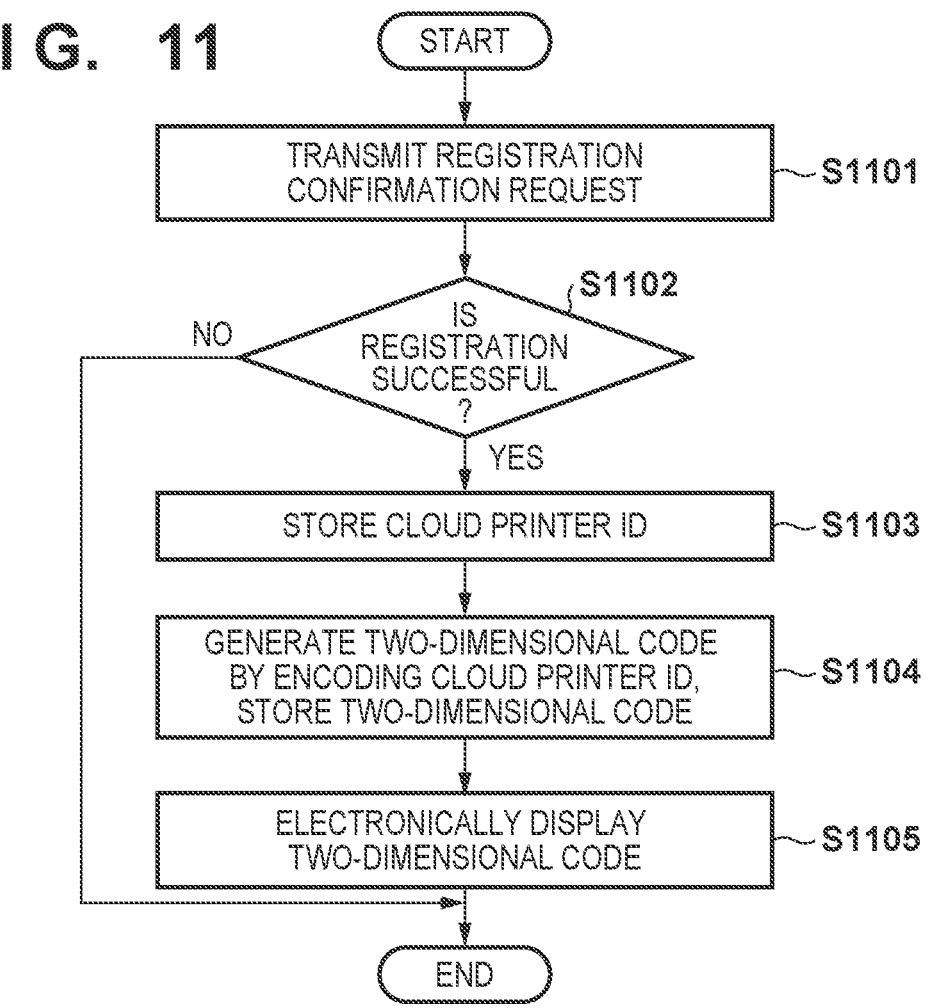
FIG. 11 is a flowchart describing an exemplary operation of registering a printing apparatus according to the first embodiment.

Operation Flow of Registration Processing That Is Performed by Printing Apparatus An exemplary operation for registering the printing apparatus 500 to the print server 130, which is performed by the printing apparatus 500, will be described in detail with reference to FIG. 11. The following operation corresponds to steps S807 to S808 in FIG. 8. In step S1101, the registration control unit 705 of the printing apparatus 500 transmits a registration confirmation request to the print server 130 (step S807 in FIG. 8).

In step S1102, the registration control unit 705 of the printing apparatus 500 determines whether or not the printing apparatus 500 has been successfully registered. If it is determined that the printing apparatus 500 has been successfully registered (YES in step S1002), the registration control unit 705 of the printing apparatus 500 advances the procedure to step S1103, and otherwise (NO in step S1002) ends the procedure. When ending the procedure, the information output unit 702 of the printing apparatus 500 may notify the user that registration has failed. The registration control unit 705 of the printing apparatus 500 may determine whether or not registration is performed successfully, based on the content of a registration confirmation response received from the print server 130.

In step S1103, the storage control unit 720 of the printing apparatus 500 stores a cloud printer ID included in the registration confirmation response. This cloud printer ID is identification information uniquely allocated to an individual logical printer associated with the printing apparatus 500. In step S1104, the two-dimensional code generation unit 708 of the printing apparatus 500 generates the two-dimensional code 722 by encoding the cloud printer ID included in the registration confirmation response. The storage control unit 720 of the printing apparatus 500 stores this two-dimensional code 722. In step S1105, the information output unit 702 of the printing apparatus 500 electronically displays the two-dimensional code 722 on the display panel 601.

Figure 12:
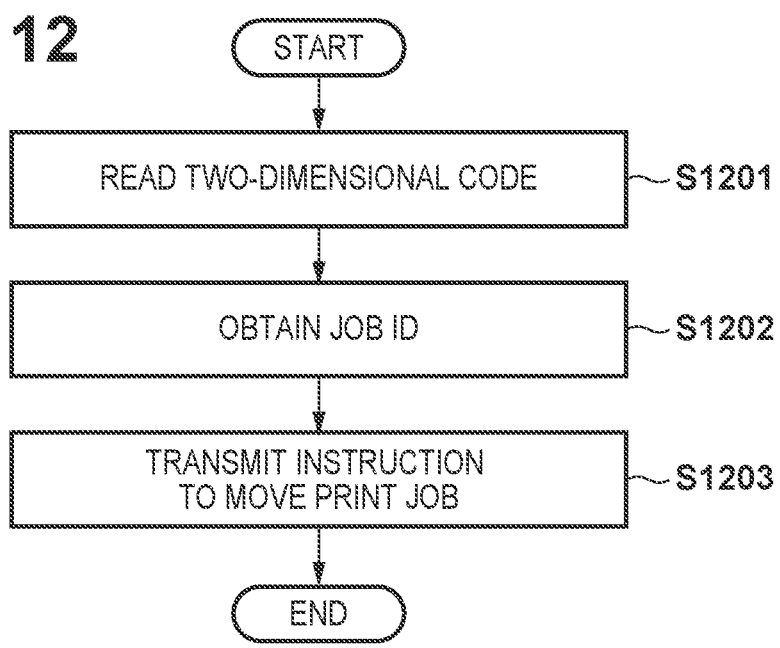
FIG. 12 is a flowchart describing an exemplary operation of transmitting an instruction to move a print job according to the first embodiment.

Operation Flow of Print Job Move Instruction That Is Given by Mobile Communication Apparatus An exemplary operation in which the mobile communication apparatus 140 transmits an instruction to move a print job from the comprehensive logical printer to an individual logical printer will be described in detail with reference to FIG. 12. The following operation corresponds to step S912 in FIG. 9. An application for executing the following operation may be installed in the mobile communication apparatus 140 in advance. Assume that, before the operation in FIG. 11 is started, the operations in FIGS. 10A and 10B have been completed, and the two-dimensional code 722 is displayed on the display panel 601 of the printing apparatus 500.

In step S1201, the mobile communication apparatus 140 reads the two-dimensional code 722 in accordance with the user directing the camera 209 toward the two-dimensional code 722 displayed on the printing apparatus 500. The mobile communication apparatus 140 then obtains the cloud printer ID indicated by the two-dimensional code 722 by decoding the two-dimensional code 722.

In step S1202, the mobile communication apparatus 140 obtains the job ID of a print job submitted by the user. The job ID may be manually input by the user, or may be selected from a list of print jobs obtained from the print server 130.

In step S1203, the mobile communication apparatus 140 transmits, to the print server 130, an instruction to associate a print job that has the job ID obtained in step S1202, with an individual logical printer that has the cloud printer ID obtained in step S1202.

As described above, according to the present embodiment, the printing apparatus 500 electronically displays the two-dimensional code 722 indicating the cloud printer ID of the individual logical printer. Accordingly, the user operations to physically preparing a two-dimensional code is reduced.

Second Embodiment

Figure 14A:
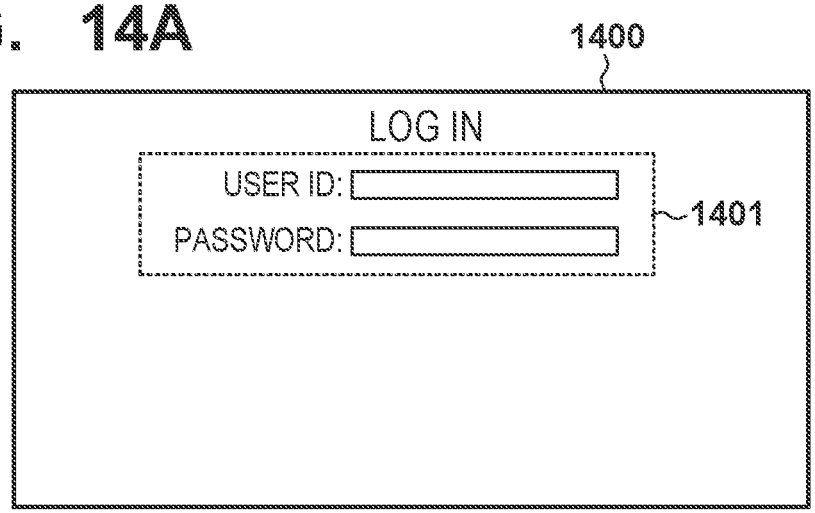
FIGS. 14A to 14C are schematic diagrams describing an example of the log-in screen according to the second embodiment.
Figure 14B:
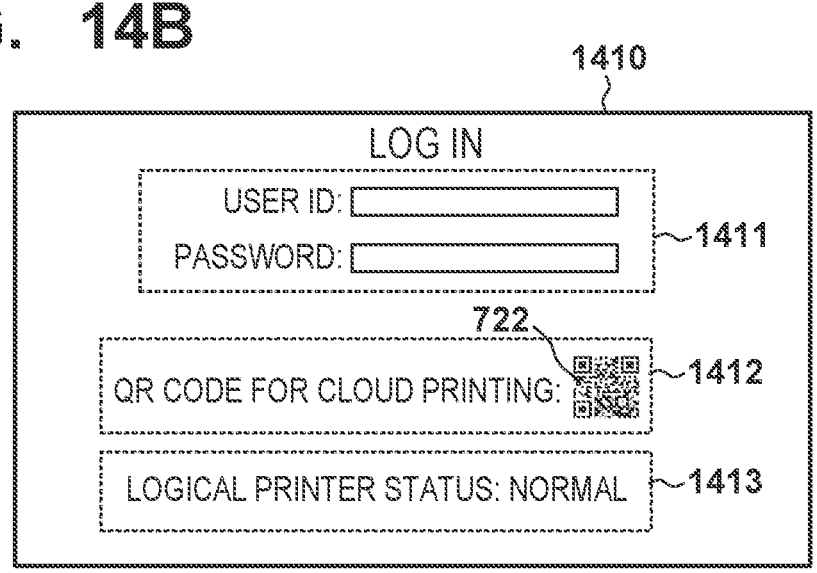
Figure 14C:
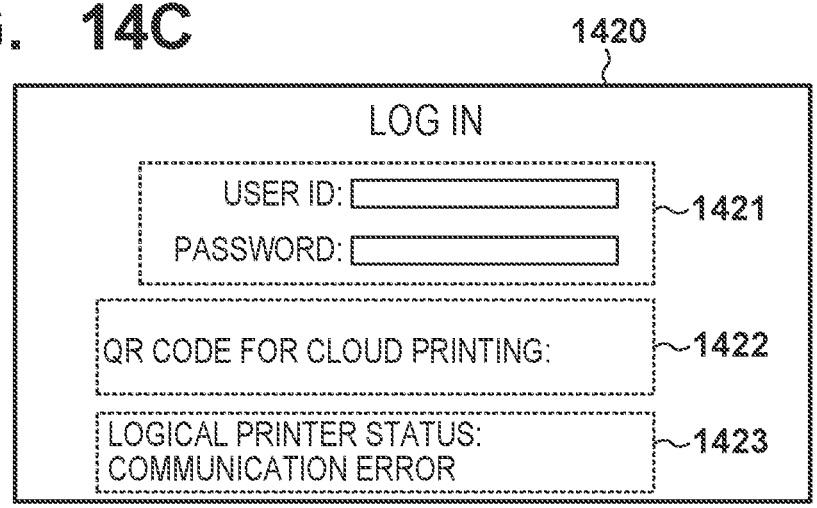
Figure 15:
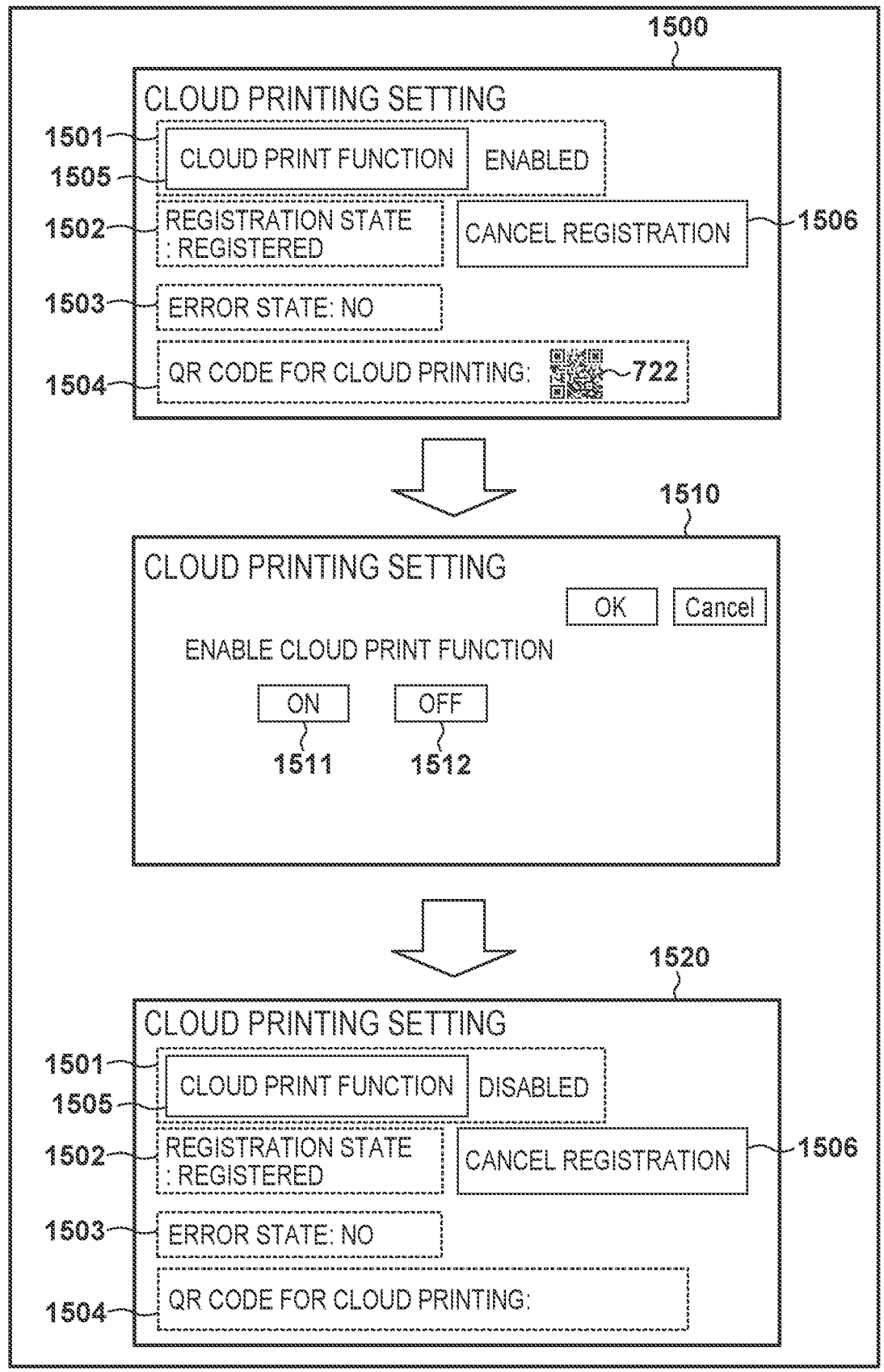
FIG. 15 is a schematic diagram describing examples of a setting screen according to the second embodiment.

A printing apparatus 500 according to a second embodiment will be described with reference to FIGS. 13 to 15. Redundant description of content that may be similar to the first embodiment is omitted. After the two-dimensional code 722 is generated, the printing apparatus 500 according to the first embodiment can always display the two-dimensional code 722 when the printing apparatus 500 is in operation. Alternatively, the printing apparatus 500 according to the second embodiment displays the two-dimensional code 722 only when a specific condition is satisfied. In the following description, a condition that is to be satisfied in order for the printing apparatus 500 to display the two-dimensional code 722 is referred to as a "display condition". In addition, a condition that is to be satisfied in order for the printing apparatus 500 not to display the two-dimensional code 722 is referred to as a "non-display condition". When both the display condition and the non-display condition are not satisfied, the printing apparatus 500 may or may not display the two-dimensional code 722.

The display condition may include a condition that a print function that uses a logical printer (that is to say, a cloud print function) is enabled. The non-display condition may include a condition that the cloud print function is disabled. In place of or in addition to this, the display condition may include a condition that the printing apparatus 500 can use a logical printer associated with the printing apparatus 500. The non-display condition may include a condition that the printing apparatus 500 cannot use a logical printer associated with the printing apparatus 500. When, for example, the printing apparatus 500 cannot access the print server 130 due to a network fault or the like, the printing apparatus 500 cannot use the logical printer. In addition, for example, when CPS provided by the print server 130 is not operating, or when CPS is operating but an error is occurring in the logical printer associated with the printing apparatus 500, the printing apparatus 500 cannot use the logical printer. Furthermore, when the logical printer associated with the printing apparatus 500 has not been registered in the print server 130 yet, or, when the registration of the printing apparatus 500 has already been canceled, the printing apparatus 500 cannot use the logical printer.

The above specific conditions included in the display condition may be suitably combined. The above specific conditions included in the display condition may be coupled through logical multiplication, for example. When, for example, both the condition that the cloud print function is enabled, and the condition that the logical printer can be used are satisfied, the display condition may be satisfied. The above specific conditions included in the non-display condition may be suitably combined. The above specific conditions included in the non-display condition may be coupled through logical sum, for example. When, for example, at least one of the condition that the cloud print function is disabled or the condition that the logical printer cannot be used is satisfied, the non-display condition may be satisfied.

An example of a display control operation of a log-in screen, which is performed by the information output unit 702 of the printing apparatus 500, will be described with reference to FIG. 13. The operation in FIG. 13 may be started, for example, when the printing apparatus 500 is started or recovered from a sleep state. The log-in screen generated by performing the operation in FIG. 13 is displayed on the display panel 601 by the information output unit 702 of the printing apparatus 500.

Figure 13:
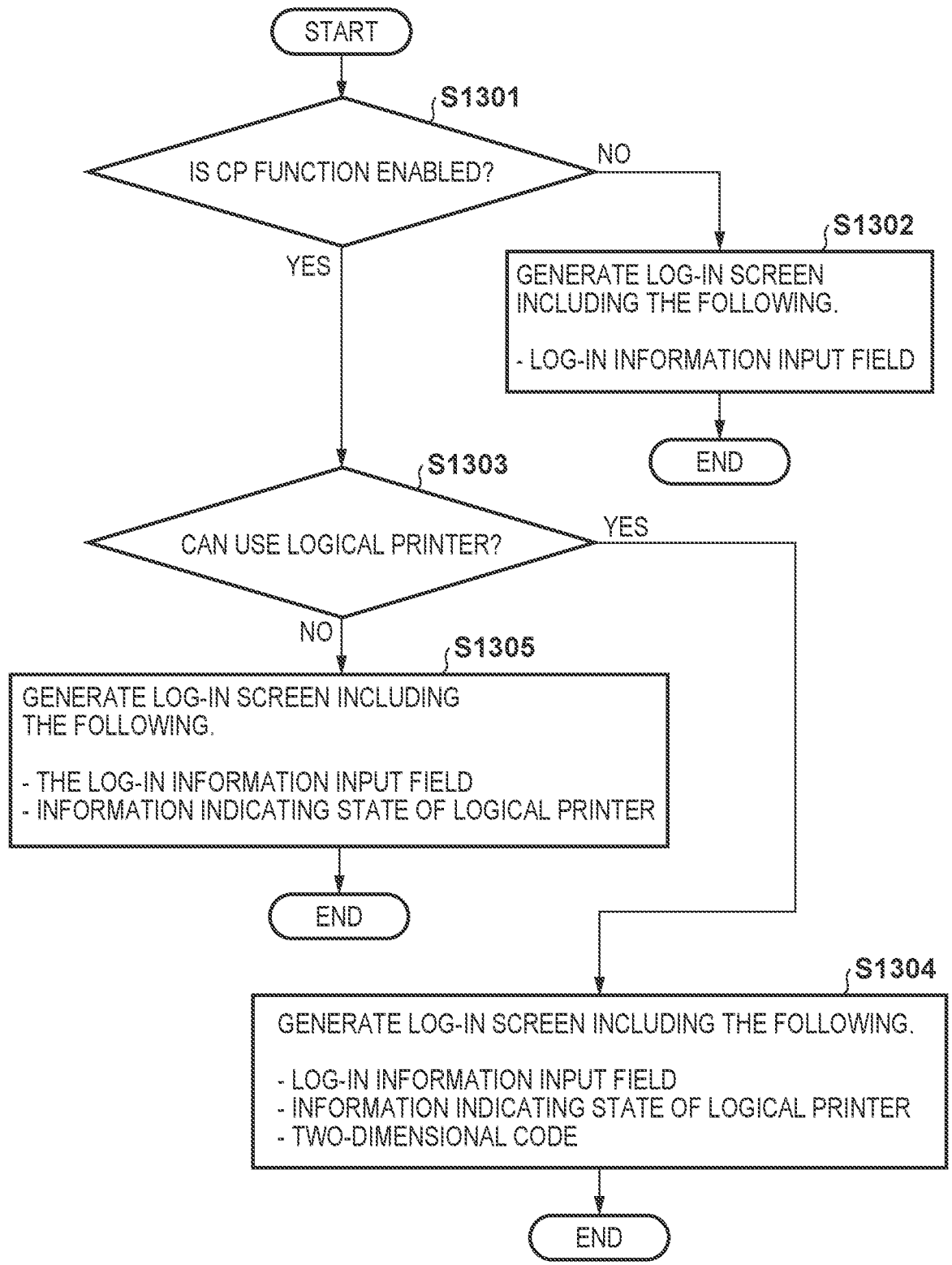
FIG. 13 is a flowchart describing an exemplary operation of generating a log-in screen according to a second embodiment.

In the example in FIG. 13, when both the condition that the cloud print function is enabled, and the condition that the logical printer can be used are satisfied, the display condition is satisfied. When at least one of the condition that the cloud print function is disabled, or the condition that the logical printer cannot be used is satisfied, the non-display condition is satisfied.

In step S1301, the information output unit 702 of the printing apparatus 500 determines whether or not the cloud print function (CP function) is enabled. The information output unit 702 of the printing apparatus 500 advances the procedure to step S1303 if it is determined that the cloud print function is enabled (YES in step S1301), and otherwise (NO in step S1301) advances the procedure to step S1302. In step S1303, the information output unit 702 of the printing apparatus 500 determines whether or not the logical printer associated with the printing apparatus 500 can be used. The information output unit 702 of the printing apparatus 500 advances the procedure to step S1304 if it is determined that the logical printer can be used (YES in step S1303), and otherwise (NO in step S1303) advances the procedure to step S1305.

In step S1302, the information output unit 702 of the printing apparatus 500 displays a log-in screen that includes a log-in information input field. FIG. 14A shows an example of a log-in screen 1400 that is generated in step S1302. The log-in screen 1400 includes a log-in information input field 1401. In this example, the log-in information input field 1401 is a field for inputting an ID and a password of the user.

In step S1304, the information output unit 702 of the printing apparatus 500 displays a log-in screen that includes a log-in information input field, information indicating the state of the logical printer, and the two-dimensional code 722. FIG. 14B shows an example of a log-in screen 1410 that is generated in step S1304. The log-in screen 1410 includes a log-in information input field 1411, a region 1412 for displaying a QR code, and a region 1413 indicating the state of the logical printer. The log-in information input field 1411 is similar to the log-in information input field 1401. The region 1412 includes the two-dimensional code 722 (specifically, a QR code). The region 1413 indicates the state of the logical printer is normal.

In step S1305, the information output unit 702 of the printing apparatus 500 displays a log-in screen that includes a log-in information input field and information indicating the state of the logical printer. FIG. 14C shows an example of a log-in screen 1420 that is generated in step S1305. The log-in screen 1420 includes a log-in information input field 1421, a region 1422 for displaying a QR code, and a region 1423 indicating the state of the logical printer. The log-in information input field 1421 is similar to the log-in information input field 1401. The region 1422 does not include the two-dimensional code 722. The region 1423 indicates that the state of the logical printer is a "communication error". In this manner, the region 1423 indicates a cause for the printing apparatus 500 not being able to use the logical printer associated with the printing apparatus 500.

As described above, the information output unit 702 adds the two-dimensional code 722 to the log-in screen 1410 when the display condition is satisfied, and does not add the two-dimensional code 722 to the log-in screens 1400 and 1420 when the non-display condition is satisfied. In addition, the log-in screen 1410 including the region 1412 and 1413 indicates that the cloud print function is enabled. The log-in screen 1420 including the regions 1422 and 1423 indicates that the cloud print function is enabled. The log-in screen 1400 including no region corresponding to these regions implicitly indicates that the cloud print function is disabled.

A setting screen for changing settings of the cloud print function that is generated by the information output unit 702 of the printing apparatus 500 will be described with reference to FIG. 15. The setting screen may be generated in accordance with an instruction to display the screen being obtained from the user. The generated setting screen is displayed on the display panel 601.

The information output unit 702 of the printing apparatus 500 first generates a setting screen 1500. The setting screen 1500 is a top screen that is first displayed when the cloud print function is set. A region 1501 indicates an enable/disable setting state of the cloud print function. In the example of the setting screen 1500, the cloud print function is enabled. A region 1502 indicates the registration state of the printing apparatus 500. In the example of the setting screen 1500, the printing apparatus 500 is registered in the print server 130. A region 1503 indicates the state of the logical printer associated with the printing apparatus 500. In the example of the setting screen 1500, no error is occurring in the logical printer, and, therefore, the printing apparatus 500 can use the logical printer. A region 1504 is a region for displaying the two-dimensional code 722. In the example of the setting screen 1500, the display condition is satisfied, and thus the region 1504 includes the two-dimensional code 722.

A button 1506 is a button for obtaining, from the user, an instruction to cancel a registration of the printing apparatus 500. A button 1505 is a button for obtaining, from the user, an instruction to make a switch to a screen for changing the enable/disable setting of the cloud print function. The information output unit 702 of the printing apparatus 500 generates a screen 1510 in accordance with the button 1505 being pressed, and displays the screen 1510 on the display panel 601.

The screen 1510 includes buttons 1511 and 1512. The button 1511 is a button for obtaining, from the user, an instruction to enable the cloud print function. The button 1512 is a button for obtaining, from the user, an instruction to disable the cloud print function. The information output unit 702 of the printing apparatus 500 generates a setting screen 1520 in accordance with the button 1512 being pressed, and displays the setting screen 1520 on the display panel 601.

The display items of the setting screen 1520 are similar to those of the setting screen 1500. In the example of the setting screen 1520, the region 1501 indicates that the cloud print function is disabled. In this case, the non-display condition is satisfied, and thus the region 1504 does not include the two-dimensional code 722.

According to the present embodiment, the two-dimensional code 722 is displayed when the display condition is satisfied, and the two-dimensional code 722 is not displayed when the non-display condition is satisfied. Accordingly, the likelihood of the cloud print function being mistakenly used when the user cannot use the cloud print function is reduced.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-096754, filed Jun. 15, 2022, which is hereby incorporated by reference herein in its entirety.

What is claimed is:
1. A printing apparatus comprising:
one or more memories that store a set of instructions; and
one or more processors that execute the instructions, the instructions, when executed, causing the printing apparatus to perform operations comprising:
receiving, from a print service, print data and a print setting associated with the printing apparatus;
performing printing based on the print data and the print setting; and
controlling a display device of the printing apparatus to display a two-dimensional code including identification information allocated by the print service to the printing apparatus,
wherein the two-dimensional code including the identification information allocated by the print service to the printing apparatus is not displayed on the display device of the printing apparatus in a situation that the printing apparatus has not been registered in the print service.

2. The printing apparatus according to claim 1, wherein
the two-dimensional code is displayed on the display device in a case where a first condition is satisfied, and
the operations further comprise ceasing to display the two-dimensional code on the display device in a case where a second condition is satisfied.

3. The printing apparatus according to claim 2, wherein
the first condition includes a print function that uses the print service being enabled, and
the second condition includes the print function that uses the print service being disabled.

4. The printing apparatus according to claim 2, wherein
the first condition includes the printing apparatus being able to use the print service, and
the second condition includes the printing apparatus being unable to use the print service.

5. The printing apparatus according to claim 2,
wherein the operations further comprise:
displaying a log-in screen that includes the two-dimensional code in a case where the first condition is satisfied; and
displaying a log-in screen that does not include the two-dimensional code in a case where the second condition is satisfied.

6. The printing apparatus according to claim 2,
wherein the operations further comprise:
in a case where the first condition is satisfied, displaying a setting screen for changing settings of a print function that uses the print service, the setting screen including the two-dimensional code; and
in a case where the second condition is satisfied, displaying a setting screen for changing the settings of the print function that uses the print service, the setting screen not including the two-dimensional code.

7. The printing apparatus according to claim 1, wherein the operations further comprise displaying a screen indicating that a print function that uses the print service is enabled and not including the two-dimensional code, in a case where the print function that uses the print service is enabled and where the printing apparatus is unable to use the print service.

8. The printing apparatus according to claim 7, wherein the screen shows a cause for the printing apparatus being unable to use the print service.

9. The printing apparatus according to claim 1, wherein
the two-dimensional code including the identification information allocated by the print service to the printing apparatus is displayed on the display device of the printing apparatus in accordance with a determination that the printing apparatus has been successfully registered to the print service, and
the two-dimensional code including the identification information allocated by the print service to the printing apparatus is not displayed on the display device of the printing apparatus in accordance with a determination that the printing apparatus has not been successfully registered to the print service.

10. A non-transitory storage medium that stores a program for causing a computer to function as the printing apparatus according to claim 1.

11. A method for controlling a printing apparatus, the method comprising:
receiving, from a print service, print data and a print setting associated with the printing apparatus;
performing printing based on the print data and the print setting; and
controlling a display device of the printing apparatus to display a two-dimensional code including identification information allocated by the print service to the printing apparatus,
wherein the two-dimensional code including the identification information allocated by the print service to the printing apparatus is not displayed on the display device of the printing apparatus in a situation that the printing apparatus has not been registered in the print service.

12. The printing apparatus according to claim 1, wherein the printing apparatus communicates with the print service using an Internet Printing Protocol (IPP) and receives the print data and the print setting using the IPP.

13. The printing apparatus according to claim 1, wherein the print service is a web service provided by a cloud print server system.

14. The printing apparatus according to claim 1, wherein the two-dimensional code of the printing apparatus is created by the print service after the printing apparatus is registered to the print service as a cloud printer.

* * * * *